United States Patent [19]

Affenzeller et al.

[11] Patent Number: 4,773,624

[45] Date of Patent: Sep. 27, 1988

[54] METHOD OF USING A MATERIAL BASED ON A CAOUTCHOUC-TYPE MIXTURE FOR PRODUCING HARD RUBBER IN ORDER TO FABRICATE ENGINE COMPONENTS, AND ENGINE COMPONENTS MANUFACTURED FROM SUCH MATERIAL

[75] Inventors: Josef Affenzeller, Graz; Wolf-Dieter Jost, Leonding-Doppl, both of Austria

[73] Assignee: Semperit Aktiengesellschaft, Vienna, Austria

[21] Appl. No.: 856,274

[22] Filed: Apr. 28, 1986

Related U.S. Application Data

[62] Division of Ser. No. 774,003, Sep. 9, 1985.

[30] Foreign Application Priority Data

Sep. 14, 1984 [EP] European Pat. Off. ........ 84890171.6

[51] Int. Cl.$^4$ .......................... F16M 5/00; C08K 7/02; C08L 7/00; C08L 9/00
[52] U.S. Cl. ............................ 248/638; 523/351; 523/457; 523/459; 523/512; 523/516; 524/432; 524/439; 524/509; 525/108; 525/109; 525/111; 525/133; 525/134; 525/166; 525/175; 525/177; 525/179; 525/183
[58] Field of Search ............... 28/112; 428/413, 465, 428/412; 523/459, 351, 512, 457; 525/108, 109, 111, 166, 133, 134, 175, 177, 179, 183; 524/432, 474

[56] References Cited

U.S. PATENT DOCUMENTS

| | | |
|---|---|---|
| 3,922,422 | 1/1975 | Wise .................................. 525/113 |
| 4,029,633 | 6/1977 | Hagopian et al. ................. 523/351 |
| 4,285,381 | 8/1981 | Furukawa et al. ................ 525/139 |
| 4,294,732 | 10/1981 | Chyachi et al. ................... 525/139 |
| 4,451,595 | 5/1984 | Lee ................................... 523/351 |
| 4,455,399 | 10/1984 | Lee ................................... 523/351 |

FOREIGN PATENT DOCUMENTS

| | | |
|---|---|---|
| 0070500 | 1/1973 | European Pat. Off. . |
| 2357736 | 2/1978 | France . |
| 1027178 | 7/1983 | U.S.S.R. . |
| 1073254 | 2/1984 | U.S.S.R. . |
| 1385478 | 2/1975 | United Kingdom . |
| 1462444 | 1/1977 | United Kingdom . |
| 1477606 | 6/1977 | United Kingdom . |
| 1513049 | 6/1978 | United Kingdom . |
| 2054626 | 2/1981 | United Kingdom . |

OTHER PUBLICATIONS

Encyclopedia of Polymer Science and Technology, vol. 12, pp. 161–177, Interscience Publishers, New York, 1970.

*Primary Examiner*—Allan M. Lieberman
*Attorney, Agent, or Firm*—Werner W. Kleeman

[57] ABSTRACT

Into a material based on a caoutchouc-type or caoutchouc-containing mixture for producing hard rubber, there is incorporated a pre-mix containing high-strength organic fibers and a liquid hardenable plastic material. The high-strength and temperature resistant material thus obtained is particularly suitable for the attenuation of noise in combustion engines when heavy-weight fillers are also added to such material. Engine components like, for example, valve covers, timing gear covers and oil pans can be manufactured from this material.

23 Claims, 1 Drawing Sheet

METHOD OF USING A MATERIAL BASED ON A CAOUTCHOUC-TYPE MIXTURE FOR PRODUCING HARD RUBBER IN ORDER TO FABRICATE ENGINE COMPONENTS, AND ENGINE COMPONENTS MANUFACTURED FROM SUCH MATERIAL

CROSS-REFERENCE TO RELATED APPLICATION

This application is a divisional application of applicants' copending U.S. patent application Ser. No. 06/774,003, filed Sept. 9, 1985, and entitled "Material Based on a Caoutchouc-type Mixture For Producing Hard Rubber, Method Of Using Such Material For Producing Engine Components, And Engine Components Manufactured From Such Material".

BACKGROUND OF THE INVENTION

The present invention relates to a new and improved material which is based on a caoutchouc-type or caoutchouc-containing mixture for producing hard rubber. In the context of this disclosure and as will be apparent from the following description, the terms "caoutchouc-type" or "caoutchouc-containing mixture" means a mixture comprising synthetic rubber or natural rubber in the unvulcanized condition or state. The present invention of this application specifically relates to a new and improved method of using such material for producing engine components and also further relates to new and improved engine components manufactured from such material.

Hitherto, materials of such type predominantly have been employed in cases in which the properties of hard rubber were essential, for example, like its chemical resistance and its excellent electrical insulating properties. Such materials, as compared to plastic materials, have the advantage that their elastic modulus can be varied in wide ranges by varying the amount of sulfur and filler content. Such standard or "classic" hard rubber materials have a certain thermal plasticity, whereby their use is limited to components which are not subjected to elevated temperatures or thermal loads. Also, these hard rubber materials heretofore could not be employed in cases in which a very high material strength was required, for example, as a substitute for metallic components in machine constructions, plant constructions and engine constructions. However, it is desirable in just those fields to utilize the advantages of hard rubber like, for example, its chemical resistance and to employ a material which is resistant against the most various attacks by, for example, acids, caustic solutions and various oils and so forth.

SUMMARY OF THE INVENTION

Therefore, with the foregoing in mind, it is a primary object of the present invention to provide a new and improved method of using a material based on a caoutchouc-type or caoutchouc-containing mixture for producing hard rubber in order to fabricate predetermined parts or components and which material possesses high strength and substantially increased temperature or heat resistance.

Another significant object of the present invention is directed to a new and improved use of such material which is based on a caoutchouc-type or caoutchouc-containing mixture for producing hard rubber, for manufacturing components, particularly in machine constructions, plant constructions and engine constructions, as a substitute for metals from which such components have been manufactured heretofore.

An important further object of the present invention is directed to new and improved machine or engine components which are manufactured from a heat resistant and oil resistant material based on a caoutchouc-type or caoutchouc-containing mixture for producing hard rubber.

A further significant object of the present invention is directed to new and improved engine components which are manufactured from a heat resistant and oil resistant hard rubber-type material and promote noise attenuation of the engine at which such inventive engine components are mounted.

Now in order to implement these and still further objects of the invention, which will become more readily apparent as the description proceeds, the material of the present development is manifested by the features that, a pre-mix containing high-strength organic fibers and a liquid hardenable plastic material, is incorporated into the caoutchouc mixture in order to obtain the caoutchouc-type or caoutchouc-containing mixture for producing hard rubber.

Due to the inventive measures, there is obtained a high-strength material having a high temperature or heat resistance. By appropriately selecting the elastomers for the caoutchouc mixture there is obtained, in combination with the proportion of hardenable plastic material contained in such caoutchouc mixture and with the fiber reinforcement, a material which, in addition to its high temperature or heat resistance and its high mechanical strength, possesses a chemical resistance which can be adapted to the momentary contemplated field of use.

The pre-mix formed by the high-strength organic fibers and the liquid hardenable plastic material permits the fibers to be incorporated into the caoutchouc mixture in a so-called nest-free or lump-free manner, i.e. without bunching or agglomerations of the fibers. Prior experiments without such measures have failed, particularly because there could not be obtained a homogeneous distribution of the fibers throughout the mixture. Particularly, non-dispersed nests or lumps of fibers formed and rendered the material useless. The excellent properties of the inventive material make this material particularly interesting for use for manufacturing components of machines, plants or engines.

According to a further development of the inventive material, the high-strength organic fibers are preimpregnated with liquid caoutchouc. This measure permits the incorporation of very high fiber proportions in the case that the amount of the liquid hardenable plastic material contained in the caoutchouc-type or caoutchouc-containing material must not be exceeded and which liquid hardenable plastic material is adapted to and advantageous for the momentary contemplated field of use of the hard rubber material. In such case, parts of a pre-selected caoutchouc contained in the caoutchouc mixture are replaced by the liquid caoutchouc.

It has been found to be particularly advantageous when aramid fibers are incorporated into the pre-mix as the high-strengh organic fibers.

According to a further development of the inventive material, polyester fibers and poly-acrylonitrile fibers are also quite suitable. These types of fibers withstand, to a large extent, the shearing stresses which occur during the mixing operation, and can be homogeneously distributed in the caoutchouc mixture. Such fibers are commercially available in various fiber lengths under the trademarks, "KEVLAR" (Dupont Co., Wilmington, Del.), "TREVIRA" (Hoechst AG, Frankfurt am Main, West Germany) and "DOLANIT" (Hoechst AG, Frankfurt am Main, West Germany).

Fibers having a length in the range of about 0.5 to about 70 mm, preferably in the range of about 1 to about 60 mm, can be incorporated into the pre-mix particularly well and without any problems. Fibers of these lengths also ensure the high mechanical strengh of the inventive material.

According to a further advantageous development of the present invention, the proportion of fibers is in the range of 10 to 100 parts, preferably up to 60 parts of fibers per 100 parts by weight of pre-selected caoutchouc contained in the caoutchouc mixture. The proportion of fibers is selected depending upon the contemplated field of use of the inventive material. The indicated ranges ensure that the fibers are homogeneously, and without problems, incorporated into the mixture.

According to a further preferred embodiment of the present invention, the liquid hardenable plastic material is selected from the group essentially consisting of liquid phenolic resin, liquid polyester resin, liquid epoxide resin or a mixture containing at least two of the aforementioned resins. The phenolic resin and the polyester resin are employed when a high temperature or heat resistance of the material is desired. The epoxide resin is particularly employed when the chemical resistance of the material is of interest.

In the aforementioned mixtures, the proportion of the liquid resin, in the inventive material, amounts to about 20 to about 200 parts per 100 parts by weight of the pre-selected caoutchouc contained in the caoutchouc mixture.

· As the pre-selected caoutchouc contained in the caoutchouc mixture, nitrile caoutchouc, natural caoutchouc or a mixture of nitrile caoutchouc and natural caoutchouc are particularly well suited.

Depending upon the contemplated field of use, fillers can be added to the material, preferably in the range of about 200 to about 1,000 parts by weight per 100 parts by weight of the pre-selected caoutchouc. By correspondingly selecting the filler, there can be obtained, for example, a resistnce against chemicals which is adapted to the momentary contemplated field of use.

When the material, according to a further preferred embodiment of the inventive material, contains heavy-weight fillers like, for example, barytes or a metal powder, then a material is formed which not only possesses the excellent properties already described hereinbefore, but which also constitutes a material of a density exceeding the density of aluminum. The material is thus of interest particularly for noise attenuation of combustion engines, for example, vehicle engines and stationary or non-mobile engines.

According to the inventive method of using the aforedescribed materials, the engine component which constitutes a troublesome source of noise like, for example, a valve cover, a timing gear cover, an oil pan or an oil cooler cover is manufactured from the inventive material. Hitherto, encapsulation was employed in connection with combustion engines which constitutes a quite effective method, however, frequently cannot be used for reasons of space. Also, suitable constructional measures were prescribed for designing the related engine components. In those cases in which noise attenuation can be achieved by complete or partial encapsulation, there exists the substantial disadvantage that access to the engine is difficult. Apart therefrom, this method is very expensive and costly. This is also true for the aforementioned measures for designing or constructing noise attenuating engine components.

In comparison to conventional materials for such engine components like, for example, aluminum or steel sheet, there is obtained the required mechanical strength and temperature or heat resistance as well as a substantially improved attenuation of solid-borne or solid propagated and air-borne or air propagated noise or sound. A particularly useful material for constructing such engine components contains about 70 to 100 parts by weight of the pre-selected caoutchouc, for example, nitrile caoutchouc and, each of the following in parts by weight per 100 parts by weight of the preselected caoutchouc: up to 30 parts of liquid caoutchouc, 32 to 50 parts of a cross-linking adjuvant, preferably sulfur, 30 to 60 parts of a vulcanization adjuvant, for example, zinc oxide, 3 to 6 parts of vulcanization accelerator, 500 to 700 parts of a heavy-weight filler, 50 to 100 parts of the liquid hardenable plastic material, for example, phenolic resin containing cross-linking agent in an amount of about 10% of the phenolic resin, and 20 to 50 parts of the high-strength organic fibers, for example, aramid fibers.

An engine component which is manufactured from such a material possesses an extremely favorable noise or sound behavior with respect to attenuating solid-borne and air-borne sound. According to a further development of the inventive concept, the attenuation of solid-borne noise or sound can be further, and substantially, improved by vibrationally decoupling the engine component from the engine block of the combustion engine.

In one construction of the inventive engine component, it is suggested that, for vibrational decoupling, a flange member which is provided for mounting the engine component at the engine block, is embedded into a soft rubber layer which preferably is oil resistant and temperature or heat resistant.

When there are present larger spaces or distances between the mounting screws or bolts, it can be advantageous for obtaining an optimum sealing of the related engine component relative to the engine block if a metallic auxiliary frame member is provided for mounting the engine component at the engine block. Such metallic auxiliary frame member is then embedded or mounted separately from the engine component in or at the soft rubber layer.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
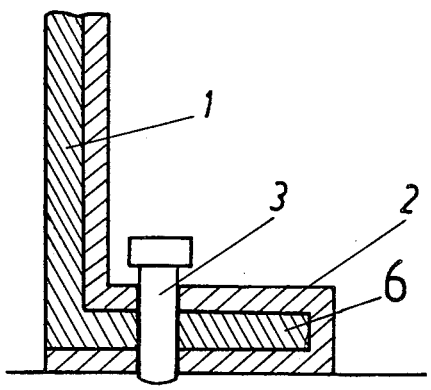
FIG. 1 is a schematic cross-sectional view of a first exemplary embodiment of an inventive engine component and shows its mounting at an engine block.

The inventive material, its mode of preparation, its physical properties and preferred uses thereof will now be explained in more detail hereinbelow with reference to specific but not limiting examples.

EXAMPLE 1

For preparing the material based on the caoutchouc-type or caoutchouc-containing mixture for producing hard rubber and comprising a caoutchouc material, a pre-mix containing high-strength organic fibers and a liquid hardenable plastic material, the following ranges of mixing proportions are particularly advantageous. The caoutchouc-type or caoutchouc-containing mixture contains, each in 100 parts by weight of preselected caoutchouc:

CAOUTCHOUC MATERIAL 50 to 100 parts of the pre-selected caoutchouc;
30 to 50 parts of cross-linking adjuvant;
10 to 100 parts of vulcanization adjuvant;
1 to 6 parts of vulcanization accelerator; and
200 to 1,000 parts of filler;

PRE-MIX 20 to 200 parts of liquid hardenable plastic material;
2 to 20 parts of cross-linking agent for the liquid hardenable plastic material;
0 to 50 parts of liquid caoutchouc; and
10 to 100 parts of high-strength organic fibers.

As the pre-selected caoutchouc for preparing the caoutchouc material there can be used, for example, nitrile caoutchouc, natural caoutchouc, styrene-butadiene caoutchouc or conventional mixtures of these caoutchouc types. This pre-selected caoutchouc is mixed with conventional additives like vulcanization adjuvants, for example, zinc oxide or lead oxide, with cross-linking adjuvants, for example, sulfur and with conventional vulcanization accelerators like, for example, basic carbonates and oxides of lead supplemented by magnesium or lime, aldehyde-amines, guanidines, thiuram sulfides, thiazoles, thiazolines, dithiocarbamates, mercaptoimidazolines. Depending on the contemplated field of use, there are used as fillers, for example, for purposes of noise attenuation, heavy-weight fillers like barytes or a metal powder, for example, iron or lead. There can also be used a number of other known fillers which have a chemical resistance adapted to the momentary purpose of use.

As the liquid hardenable plastic material, there is used in particular phenolic resin, polyester resin, epoxide resin or a mixture of these resins containing a commercially available cross-linking agent.

As the liquid caoutchouc, there is suited, for example, low-molecular synthetic caoutchouc or depolymerized natural caoutchouc.

Particularly suitable high-strength organic fibers are aramid fibers, polyester fibers and poly-acrylonitrile fibers. Aramid fibers are available in different fiber lengths or as felt fibers under the aforementioned trademark "KEVLAR" (Dupont Co., Wilmington, Del.). Polyester fibers and poly-acrylonitrile fibers are commercially available in the market under the respective aforementioned trademarks "TREVIRA" (Hoechst AG, Frankfurt am Main, West Germany) and "DOLANIT" (Hoechst AG, Frankfurt am Main, West Germany). Preferably, fibers are used which have a staple fiber length in the range of about 0.5 to about 70 mm, particularly in the range of about 1 to about 60 mm. Such fibers ensure high mechanical strength of the material and can be readily worked into the material mixture.

During the manufacture of the inventive material, a pre-mix is prepared from the fibers to be used and with the addition of the liquid resin and, if desired, liquid caoutchouc. There is thus formed a fiber paste which can be incorporated or worked in a substantially fiber nest-free or lump-free manner into the caoutchouc material provided with the fillers. This incorporation is performed using one of the conventional mixing processes employing rollers or kneaders. The high-strength organic fibers withstand, to a large extent, the shearing stresses occurring during such mixing process and are homogenously distributed throughout the mixture.

Depending upon the contemplated field of use, the mixture is further processed by extruding, injection molding or pressing.

The inventive material has a number of properties which make this material particularly suited for a number of purposes or fields of use which will be described further hereinbelow. Depending upon the contemplated field of use, its hardness is approximately in the range of between about 80 and about 95 Shore D. The fiber reinforcement causes a high mechanical strength, particularly a high bending or flexural strength and impact strength. The resin proportion results in an excellent temperature or heat resistance which, when determined according to German Industrial Standard No. 53,460, is above 250° C.

Due to such excellent properties, a preferred field of use of the inventive material is the noise attenuation of combustion engines. For such use, a number of otherwise troublesome noise generating engine components are replaced by engine components which advantageously are manufactured directly from the inventive material. In such use, there is admixed to the material, a heavy-weight filler so that a density can be obtained which exceeds the density of aluminum. As a result, there can be achieved a very favorable sound absorbing effect. Troublesome sources of noise or sound in combustion engines are particularly the valve covers, the timing gear covers, the oil pans and the oil cooler covers. Such engine components can be manufactured in their entirety or at least in part from the inventive material.

When the engine component which is manufactured from the inventive material, is mounted at the engine block with the interposing of an appropriate, conventional seal or gasket, the solid-borne noise or sound is very strongly attenuated and also the air-borne noise or sound is correspondingly reduced in comparison to conventional constructions made of aluminum or steel sheet or plating. Related measurements have shown that a modal of noise attenuation behavior can be readily achieved which is improved by a factor of 10 over the noise attenuation behavior of aluminum components or components which are made of steel sheet or plating. It has been found that the noise attenuation action of the inventive material is already present to the full extent, particularly in the acoustically important frequency range of 1,000 to 2,000 Hz.

The following second example illustrates an exemplary mixture for such noise attenuation material which is particularly suited as a material for manufacturing the aforementioned engine components.

EXAMPLE 2

90 parts nitrile caoutchouc;
10 parts liquid caoutchouc;
35 parts cross-linking adjuvant (sulfur);
40 parts zinc oxide;
5 parts vulcanization accelerator;
700 parts heavy-weight filler;
80 parts liquid phenolic resin;
8 parts resin cross-linking agent; and
25 parts aramid fibers An additional reduction of the solid-borne noise or sound level and thus also of the air-borne noise or sound level is achieved by vibrationally decoupling the engine component which is manufactured from the inventive material such as, for example, the valve cover, from the engine block.

Figure 2:
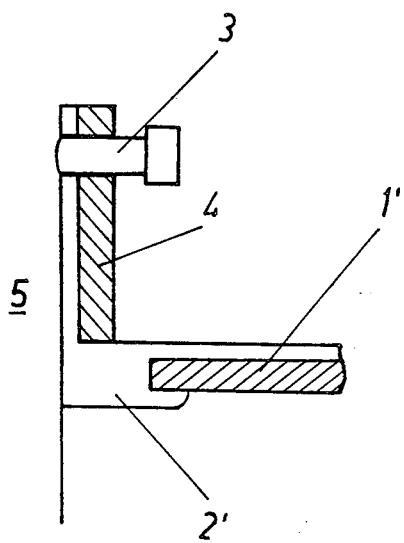
FIG. 2 is a schematic sectional view of a second exemplary embodiment of the inventive engine component and shows its mounting at the engine block.

It is to be understood that only enough of the construction of the engine component has been shown in the accompanying drawings of FIGS. 1 and 2 as is needed for those skilled in the art to readily understand the underlying principles and concepts of the present development, while simplifying the showing of the drawings. Turning attention now to FIGS. 1 and 2 of the drawings, there are illustrated two exemplary embodiments depicting vibrational decoupling from the engine block of the engine component which is manufactured from the inventive material. Such vibrational decoupling is achieved by the interposing of an oil resistant and temperature or heat resistant soft rubber layer. Each of the two Figures represents a sectional view of the mounting region of the aforementioned engine component. The engine component is designated by the reference numerals 1 and 1' in FIGS. 1 and 2, respectively, and is manufactured from the inventive material. Such engine component may constitute, for example, a timing gear cover, a valve cover, an oil pan or an oil cooler cover.

According to the illustration in FIG. 1, the engine component 1 contains an encircling flange member 6 which is provided for mounting the engine component 1 at the engine block 5 and which is embedded in a soft rubber layer 2. As illustrated, the soft rubber layer 2 covers the entire engine component 1 and thus an additional positive effect with respect to the noise attenuating action achieved by the engine component 1 can be obtained.

At greater screw or bolt mounting distances, it may be advantageous for providing the required sealing action if the engine component 1', as illustrated in FIG. 2, is mounted at the engine block 5 by means of a metallic auxiliary frame member 4. The region or section of the engine component 1', which region is associated with the engine block 5, is embedded in a soft rubber layer 2'. A further portion of the soft rubber layer 2' is interposed between the metallic auxiliary frame member 4 and the engine block 5 so that vibrational decoupling is ensured.

Due to the use of the soft rubber layer 2 or 2', it is not absolutely necessary that a separate seal is used. The required sealing forces are applied either by means of the engine component 1 in the embodiment illustrated in FIG. 1 or by means of the metallic auxiliary frame member 4 in the embodiment illustrated in FIG. 2.

There exists a multitude of possibilities for using the inventive material, particularly in the field of engine construction. By correspondingly varying the formula or recipe, the resistance against chemicals can be readily adapted to further contemplated purposes or fields of use in the general field of machine construction in which the high strength and temperature or heat resistance are also of advantage. Thus, for example, a mixture can be made resistant particularly against hot water-glycol mixtures by using and selecting corresponding polymers and fillers. From such material, for example, water pump rotors for combustion engines can be produced. When there is obtained chemical resistance against hot sulfuric acid by appropriate measures concerning the selection of the caoutchouc, the filler and the resin, there can also be fabricated from this material, for example, tube sheets or plates for spin bath evaporators.

While there are shown and described present preferred embodiments of the invention, it is to be distinctly understood that the invention is not limited thereto, but may be otherwise variously embodied and practiced within the scope of the following claims.

Accordingly, what we claim is:

1. A method of fabricating an engine component from a rubber mixture for producing hard rubber, said rubber mixture containing a preselected synthetic nitrile rubber, another synthetic diene rubber or natural rubber, vulcanizing adjuvants, at least one filler and a pre-mix containing high-strength organic fibers and a liquid hardenable plastic material, and fabricating an engine component from said rubber mixture;

said at least one filler being present in said rubber mixture in an amount in a proportion in the range of 200 to 1000 parts by weight per 100 parts by weight of said preselected rubber;

said pre-mix being present in an amount in a proportion in the range of 30 to 350 parts by weight per 100 parts by weight of said preselected rubber;

said pre-mix further containing a liquid low molecular weight synthetic rubber or liquid depolymerized natural rubber present in an amount in the range of about 0 to about 50 parts by weight per 100 parts by weight of said preselected rubber;

said liquid hardenable plastic material containing a cross-linking agent for hardening said liquid hardenable plastic material;

said liquid hardenable plastic material being selected from the group consisting of liquid phenolic resin, liquid polyester resin, liquid epoxy resin and a mixture of at least two of the aforementioned resins;

said liquid hardenable plastic resin being present in an amount in a proportion in the range of about 20 to about 200 parts by weight per 100 parts of said preselected rubber;

said high-strength organic fibers being selected from the group consisting of aramid fibers, polyester fibers and polyacrylonitrile fibers which substantially withstand the shearing stresses occurring during the material mixing operation; and said high-strength organic fibers being present in an amount in a proportion in the range of about 10 to about 100 parts by weight per 100 parts by weight of said preselected rubber.

2. The method as defined in claim 1, wherein:

said engine component is a valve cover.
3. The method as defined in claim 1, wherein:
said engine component is a timing gear cover.
4. The method as defined in claim 1, wherein:
said engine component is an oil pan.
5. The method as defined in claim 1, wherein:
said engine component is an oil cooler cover.
6. The method as defined in claim 1, wherein:
said high-strength organic fibers are high-strength fibers which are pre-impregnated with said liquid low molecular weight synthetic rubber or liquid depolymerized natural rubber.
7. The method as defined in claim 1, wherein:
said high-strength organic fibers are high-strength organic fibers which have a fiber length in the range of about 0.5 to about 70 mm.
8. The method as defined in claim 7, wherein:
said high-strength organic fibers are high-strength organic fibers which have a fiber length in the range of about 1 to about 60 mm.
9. The method as defined in claim 1, wherein:
said high-strength organic fibers are contained in said rubber material in a proportion in the range of about 10 to about 60 parts per 100 parts by weight of said preselected rubber contained in said rubber material.
10. The method as defined in claim 1, wherein:
said preselected rubber is selected from the group consisting of nitrile rubber, natural rubber and a mixture of nitrile rubber and natural rubber.
11. The method as defined in claim 1, wherein:
said filler is a heavy-weight filler selected from the group consisting of barytes and metal powder.
12. A method of fabricating an engine component from a rubber mixture for producing hard rubber, said rubber mixture containing a pre-selected synthetic rubber or natural rubber, a pre-mix containing a mixture of high-strength organic fibers and a liquid hardenable plastic material, and fabricating an engine component from said material;
said rubber mixture containing a rubber selected from the group consisting of nitrile rubber, natural rubber, and a mixture of nitrile rubber and natural rubber;
said high-strength organic fibers of said pre-mix being selected from the group consisting of aramid fibers, polyester fibers and polyacrylonitrile fibers;
said high-strength organic fibers being present in an amount in a proportion in the range of about 10 to about 100 parts per 100 parts of rubber contained in said rubber mixture;
said liquid hardenable plastic material being selected from the group consisting of liquid phenolic resin, liquid polyester resin, liquid epoxide resin and a mixture of at least two of the aforementioned resins; and
said liquid hardenable plastic resin being present in an amount in a proportion in the range of about 20 to about 200 parts per 100 parts of rubber contained in said rubber mixture.
13. An engine component manufactured from a rubber mixture for producing hard rubber, said rubber mixture containing a rubber material which contains a preselected synthetic nitrile rubber, another synthetic diene rubber or natural rubber, vulcanizing additives, at least one filler and a pre-mix containing a liquid hardenable plastic material and high-strength organic fibers, said engine component comprising:

a rubber material containing:
(a) 70 to 100 parts by weight of said preselected rubber;
(b) said vulcanizing additives comprising:
 (i) 30 to 50 parts of a cross-linking agent;
 (ii) 30 to 60 parts of a vulcanization adjuvant;
 (iii) 3 to 6 parts of a vulcanization accelerator;
(c) 500 to 700 parts of a heavy-weight filler;
said heavy-weight filler being selected from the group consisting of barytes and a preselected metal powder;
said pre-mix being present in an amount in the range of 70 to 180 parts;
said pre-mix containing:
up to 30 parts of liquid low molecular weight synthetic rubber or liquid depolymerized natural rubber;
said liquid hardenable plastic material containing a cross-linking agent for hardening said liquid hardenable plastic material;
said liquid hardenable plastic material being selected from the group consisting of liquid phenolic resin, liquid polyester resin, liquid epoxy resin and a mixture of at least two of the aforementioned resins;
said liquid hardenable plastic resin being present in an amount in the range of about 50 to about 100 parts;
said high-strength organic fibers being selected from high-strength organic fibers which substantially withstand the shearing stresses occurring during the material mixing operation;
said high-strength organic fibers being selected from the group consisting of aramid fibers, polyester fibers and poly-acrylonitrile fibers;
said high-strength organic fibers being present in an amount in the range of about 20 to about 50 parts; and
each one of said cross-linking agent, said vulcanization adjuvant, said vulcanization accelerator, said heavy-weight filler, said pre-mix, said liquid low molecular weight synthetic rubber or liquid depolymerized natural rubber, said liquid hardenable plastic material, and said high-strength organic fibers being present in parts by weight per 100 parts by weight of said preselected rubber.
14. The engine component as defined in claim 13, wherein:
said preselected rubber is preselected from the group consisting of nitrile rubber.
15. The engine component as defined in claim 13, wherein:
said cross-linking agent constitutes sulfur.
16. The engine component as defined in claim 13, wherein:
said vulcanization adjuvant constitutes zinc oxide.
17. The engine component as defined in claim 13, wherein:
said liquid hardenable plastic material is selected from the group essentially consisting of phenolic resins; and
said phenolic resin containing about 10% by weight of said cross-linking agent.
18. The engine component as defined in claim 13, further including:
means for mounting said engine component at an engine block in a vibrationally decoupled manner.
19. The engine component as defined in claim 18, wherein:

said means for mounting said engine component at said engine block in a vibrationally decoupled manner constitutes a soft rubber layer;

said engine component containing a flange member for mounting said engine component at said engine block; and said flange member being embedded into said soft rubber layer.

20. The engine component as defined in claim 19, wherein:

said soft rubber layer constitutes an oil resistant and heat resistant soft rubber layer.

21. The engine component as defined in claim 18, wherein:

said means for mounting said engine component at said engine block in a vibrationally decoupled manner constitutes a soft rubber layer;

a metallic auxiliary frame member for mounting said engine component at said engine block;

said engine component being at least partially embedded into said soft rubber layer separately from said metallic auxiliary frame member.

22. The engine component as defined in claim 21, wherein:

said soft rubber layer constitutes an oil resistant and heat resistant soft rubber layer.

23. An engine component manufactured from a rubber mixture for producing hard rubber, which rubber mixture is produced from a rubber material containing a pre-selected synthetic rubber or natural rubber and into which there is incorporated a pre-mix containing a liquid hardenable plastic material and high-strength organic fibers, said engine component comprising:

70 to 100 parts by weight of said pre-selected rubber contained in said rubber material;

said pre-selected rubber being selected from the group consisting of nitrile rubber, natural rubber, and a mixture of nitrile rubber and natural;

up to 30 parts of liquid low molecular weight synthetic rubber or liquid depolymerized natural rubber;

30 to 50 parts of a cross-linking agent;

30 to 60 parts of a vulcanization adjuvant;

3 to 6 parts of a vulcanization accelerator;

500 to 700 parts of a heavy-weight filler;

50 to 100 parts of said liquid hardenable plastic material;

said liquid hardenable plastic material being selected from the group consisting of liquid phenolic resin, liquid polyester resin, liquid epoxy resin and a mixture of at least two of the aforementioned resins;

said liquid hardenable plastic resin being present in an amount in a proportion in the range of about 20 to about 200 parts per 100 parts of said pre-selected rubber contained in rubber mixture;

20 to 50 parts of said high-strength organic fibers;

said high-strength organic fibers being selected from the group consisting of aramid fibers, polyester fibers and polyacrylonitrile fibers;

said high-strength organic fibers being present in an amount in a proportion in the range of about 10 to about 100 parts per 100 parts of said preselected rubber in said rubber mixture; and each one of said liquid low molecular weight synthetic rubber or liquid depolymerized natural rubber, said cross-linking agent, said vulcanization adjuvant, said vulcanization accelerator, said heavy-weight filler, said hardenable plastic material, and said high-strength organic fibers being present in parts by weight per 100 parts by weight of said preselected rubber.

* * * * *